Patented Jan. 3, 1939

2,142,594

UNITED STATES PATENT OFFICE 2,142,594

WATER-INSOLUBLE AZO DYESTUFFS AND FIBER DYED THEREWITH

Arthur Zitscher, Cronberg in Taunus, Robert Schmitt, Darmstadt, and Herbert Kracker, Frankfort-on-the-Main, Germany, assignors to General Aniline Works, Inc., New York, N. Y., a corporation of Delaware No Drawing. Application September 6, 1935, Serial No. 39,501. In Germany September 12, 1934

6 Claims. (Cl. 260—176)

The present invention relates to valuable water-insoluble azo dyestuffs and to fiber dyed therewith; more particularly it relates to dyestuffs corresponding to the following general formula:

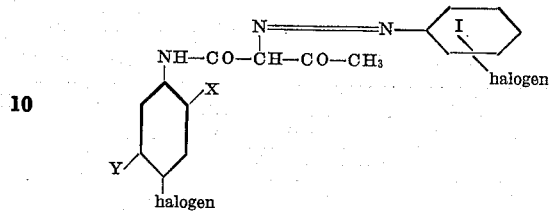

wherein X and Y stand for alkyl or alkoxy, Y meaning alkoxy in case X stands for alkyl, and alkyl in case X stands for alkoxy, and wherein the benzene nucleus I may be further substituted by halogen, alkyl, alkoxy or aryloxy groups.

We have found that valuable water-insoluble azo dyestuffs are obtainable by coupling in substance, on the fiber or on a substratum adapted for the production of lakes arylides of acetoacetic acid of the following formula:

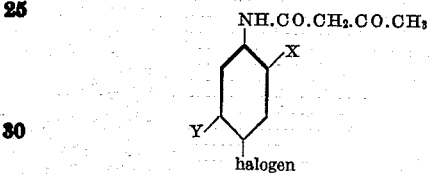

wherein X and Y stand for alkyl or alkoxy, Y meaning alkoxy in case X stands for alkyl, and alkyl in case X stands for alkoxy, with diazocompounds from mono-amines of the benzene series which contain as substituents at least one halogen atom and, if desired, halogen, alkyl, alkyloxy or aryloxy groups.

When produced in substance, the new dyestuffs may be used for the preparation of valuable pigments, but they may also be used with advantage for the preparation of water-insoluble dyestuffs on the fiber according to the ice-color-method or one of the usual printing methods, for instance, in direct printing, or according to the known nitrosamine printing process or the like.

The yellow dyestuffs thus obtained are distinguished by their good all round fastness properties, particularly by very good fastness to soaping; a great number of them has also a high fastness to light.

The following examples serve to illustrate the invention, but they are not intended to limit it thereto, the parts being by weight, unless otherwise stated:

(1) 17.6 parts of 1-amino-2-methyl-4,5-dichlorobenzene are diazotized in the usual manner and the diazo-solution is coupled with a solution of 26.2 parts of 1-(acetoacetylamino)-5-methoxy-2-methyl-4-chlorobenzene in dilute caustic soda solution to which there has been added Turkey red oil and the quantity of sodium acetate which is necessary to bind the mineral acid in excess. The separated dyestuff is filtered off and washed well. When produced in the usual manner, advantageously in the form of a paste on a substratum, it yields a greenish-yellow lake of high fastness to light. The dyestuff has the following formula:

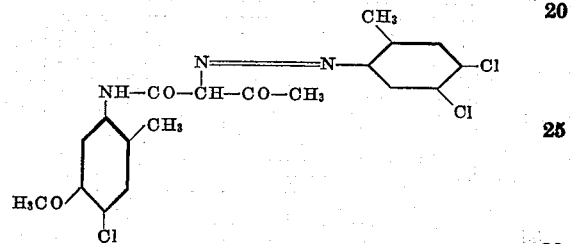

(2) Bleached cotton yarn is grounded in a solution containing per liter:

| | |
|---|---|
| 1-(acetoacetyl-amino)-2-methoxy-5-methyl-4-chlorobenzene | grams 3 |
| Caustic soda solution of 34° Bé | cc 6 |
| Turkey red oil | cc 5 |
| Sodium chloride | grams 100 | thoroughly squeezed and developed in a diazo-solution which has been neutralized by means of sodium acetate and which contains per liter 1.76 grams of the diazo-compound from 1-amino-3-methyl-2,4-dichlorobenzene, then rinsed and soaped at boiling temperature in a solution containing per liter:

| | Grams |
|---|---|
| Sodium carbonate | 1 |
| Soap | 3 |
| Sodium hydrosulfite | 0.5 |

A greenish-yellow dyeing of very good fastness to light is obtained.

The dyestuff may also be produced on other vegetable fibers, on native cellulose, for instance, linen or on regenerated cellulose, for instance, viscose artificial silk, and also on wool and other animal fibers, for instance, spun silk, on which a more reddish dyeing is obtained.

(3) Desized and bleached cotton piece goods are padded on a foulard in a solution containing per liter:

| | |
|---|---|
| 1-(acetoacetyl-amino)-2-methoxy-5-methyl-4-bromobenzene | grams 15 |
| Caustic soda solution of 34° Bé | cc 22.5 |
| Turkey red oil | cc 20 |

The grounded and dried material is passed through a diazosolution which is obtained in the following manner:

7.1 grams of 1-amino-2-methyl-4-chlorobenzene are dissolved in
14 cc. of hydrochloric acid of 20° Bé. and
200 cc. of water, the solution is cooled to 10° C. and diazotized with an aqueous solution of
3.6 grams of sodium nitrite. Thereupon, there are added
7 grams of crystallized sodium acetate and
20 cc. of acetic acid of 50% strength and the whole is made up to
1 liter.

The material is then exposed to the air for a short time, repeatedly rinsed with cold water and finally soaped at boiling temperature.

A lemon-yellow dyeing of very good fastness to light is thus obtained.

(4) Desized and bleached cotton piece goods are printed with the following paste:

20 grams of 3-methyl-4,6-dichlorobenzene-1-nitrosamine-sodium,
24 grams of 1-(acetoacetyl-amino)-2-methoxy-5-methyl-4-chlorobenzene,
30 grams of caustic soda solution of 34° Bé. and
20 grams of Turkey red oil are stirred into a paste with
50 grams of water, then dissolved in
356 grams of warm water and made up with
500 grams of neutral starch tragacanth thickening to
1 kilo of printing color.

After drying the printed material is steamed for 3 minutes in a moist state or exposed to the air over-night and thereupon passed at 80° C. to 90° C. through a solution containing per liter 20 cc. of acetic acid of 50% strength, rinsed and soaped.

A lemon-yellow print of very good fastness to light is obtained.

The process may be carried out in the same manner also with other diazo-compounds and other aceto-acetic acid arylides of this series.

The following table indicates a number of tints of some other azo dyestuffs obtainable according to the present invention:

| | Aceto-acetyl compound of— | Coupled with the diazo-compound of— | Tint |
|---|---|---|---|
| 1 | 1-amino-2-methoxy-5-methyl-4-chlorobenzene | 1-amino-2-methyl-5-chlorobenzene | Lemon-yellow. |
| 2 | do | 1-amino-2-methyl-4-chlorobenzene | Yellow. |
| 3 | do | 1-amino-2-methyl-3-chlorobenzene | Lemon-yellow. |
| 4 | do | 1-amino-2, 5-dichlorobenzene | Greenish-yellow. |
| 5 | do | 1-amino-2, 3, 4-trichlorobenzene | Do. |
| 6 | do | 1-amino-2-phenoxy-5-chlorobenzene | Lemon-yellow. |
| 7 | do | 1-amino-2-(2-methyl-phenoxy)-5-chlorobenzene | Do. |
| 8 | do | 1-amino-2-(4-methoxy-phenoxy)-5-chlorobenzene | Yellow. |
| 9 | do | 1-amino-4-methyl-3-chlorobenzene | Lemon-yellow. |
| 10 | do | 1-amino-2-methyl-5-bromobenzene | Do. |
| 11 | do | 1-amino-2-methyl-3, 4-dichlorobenzene | Greenish yellow. |
| 12 | do | 1-amino-2-methyl-4,5-dichlorobenzene | Lemon-yellow. |
| 13 | do | 1-amino-4-methyl-2, 5-dichlorobenzene | Greenish yellow. |
| 14 | do | 1-amino-2-methoxy-5-chlorobenzene | Yellow. |
| 15 | do | 1-amino-2-methoxy-3-chlorobenzene | Lemon-yellow. |
| 16 | do | 1-amino-2-ethoxy-5-chlorobenzene | Do. |
| 17 | do | 1-amino-2-ethoxy-4-bromo-5-chlorobenzene | Yellow. |
| 18 | do | 1-amino-2-methoxy-4, 5-dichlorobenzene | Lemon-yellow. |
| 19 | 1-amino-2-methoxy-5-methyl-4-bromobenzene | 1-amino-2-methyl-5-chlorobenzene | Do. |
| 20 | do | 1-amino-2-methyl-3-chlorobenzene | Do. |
| 21 | do | 1-amino-2, 5-dichlorobenzene | Yellow. |
| 22 | do | 1-amino-2, 3, 4-trichlorobenzene | Greenish yellow. |
| 23 | do | 1-amino-3-methyl-2, 4-dichlorobenzene | Do. |
| 24 | do | 1-amino-2-methoxy-5-chlorobenzene | Lemon-yellow. |
| 25 | do | 1-amino-3-methyl-4, 6-dichlorobenzene | Do. |
| 26 | do | 1-amino-2-phenoxy-5-chlorobenzene | Greenish yellow. |
| 27 | do | 1-amino-2-(4-chlorphenoxy)-5-chlorobenzene | Yellow. |
| 28 | do | 1-amino-2-(naphthyl-2-hydroxy)-5-chlorobenzene | Lemon-yellow. |
| 29 | do | 1-amino-2-methyl-5-bromobenzene | Do. |
| 30 | do | 1-amino-2-methyl-3, 4-dichlorobenzene | Greenish yellow. |
| 31 | do | 1-amino-2-methyl-4, 5-dichlorobenzene | Do. |
| 32 | do | 1-amino-4-methyl-2, 3-dichlorobenzene | Lemon-yellow. |
| 33 | do | 1-amino-2-methoxy-3-chlorobenzene | Greenish yellow. |
| 34 | do | 1-amino-2-ethoxy-5-chlorobenzene | Do. |
| 35 | do | 1-amino-2-ethoxy-4-bromo-5-chlorobenzene | Lemon-yellow. |
| 36 | do | 1-amino-2-methoxy-4, 5-dichlorobenzene | Greenish yellow. |
| 37 | 1-amino-5-methoxy-2-methyl-4-chlorobenzene | 1-amino-2-methyl-3-chlorobenzene | Lemon-yellow. |
| 38 | do | 1-amino-2-methyl-4-bromobenzene | Do. |
| 39 | do | 1-amino-2-methyl-5-bromobenzene | Yellow. |
| 40 | do | 1-amino-2-methyl-4-iodobenzene | Lemon-yellow. |
| 41 | do | 1-amino-2-methyl-4, 5-dichlorobenzene | Do. |
| 42 | do | 1-amino-4-methyl-2, 5-dichlorobenzene | Do. |
| 43 | do | 1-amino-4-methyl-2, 3-dichlorobenzene | Do. |
| 44 | do | 1-amino-2-methyl-4-bromo-5-chlorobenzene | Do. |
| 45 | do | 1-amino-2-ethoxy-4-bromo-5-chlorobenzene | Do. |
| 46 | do | 1-amino-2, 5-dimethoxy-4-bromobenzene | Yellow. |
| 47 | do | 1-amino-2-phenoxy-3-chlorobenzene | Do. |
| 48 | 1-amino-2-ethoxy-5-ethyl-4-chlorobenzene | 1-amino-2-methyl-5-chlorobenzene | Greenish yellow. |
| 49 | do | 1-amino-2-methyl-3-chlorobenzene | Yellow. |
| 50 | do | 1-amino-3-methyl-2, 4-dichlorobenzene | Do. |
| 51 | do | 1-amino-2-phenoxy-5-chlorobenzene | Lemon-yellow. |
| 52 | do | 1-amino-2-methyl-4-bromobenzene | Yellow. |
| 53 | do | 1-amino-2-methyl-4, 5-dichlorobenzene | Reddish yellow. |
| 54 | do | 1-amino-2-methyl-4-bromo-5-chlorobenzene | Do. |
| 55 | do | 1-amino-2-ethoxy-4-bromo-5-chlorobenzene | Do. |
| 56 | do | 1-amino-3-methyl-4, 6-dichlorobenzene | Yellow. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water and alkalies and to tend to depreciate the fastness of the dyestuffs to alkalies. Substituents of this kind are, for instance, the sulfonic acid and the carboxylic acid group.

We claim:

1. The water-insoluble azo dyestuff of the following formula:

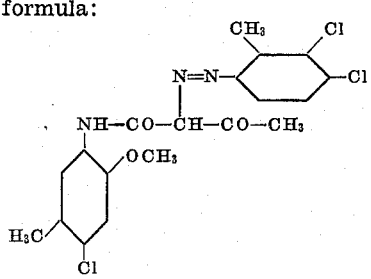

yielding, when produced on the fiber, greenish-yellow dyeings of good fastness properties, particularly of very good fastness to soaping and to light.

2. The water-insoluble azo dyestuff of the following formula:

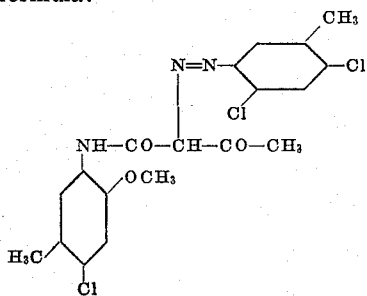

yielding, when produced on the fiber, lemon-yellow dyeings of good fastness properties, particularly of very good fastness to soaping and to light.

3. Fiber dyed with the water-insoluble azo dyestuff as claimed in claim 1.

4. Fiber dyed with the water-insoluble azo dyestuff as claimed in claim 2.

5. The water-insoluble azo dyestuffs of the following general formula:

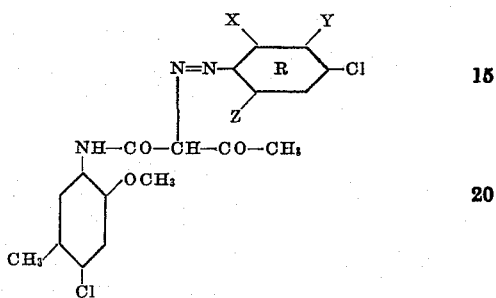

wherein X stands for one of the group consisting of hydrogen and methyl, Y for one of the group consisting of chlorine and methyl and Z for one of the group consisting of hydrogen and chlorine, the benzene nucleus R always containing one methyl group and two chlorine atoms, yielding when produced on the fiber, yellow dyeings of good fastness properties, particularly of very good fastness to soaping and to light.

6. Fiber dyed with the water-insoluble azo dyestuff as claimed in claim 5.

ARTHUR ZITSCHER.
ROBERT SCHMITT.
HERBERT KRACKER.

CERTIFICATE OF CORRECTION.

Patent No. 2,142,594. January 3, 1939.

ARTHUR ZITSCHER, ET AL.

It is hereby certified that error appears in the printed specification of the above numbered patent requiring correction as follows: Page 2, in the table, item 7, in the column under the heading "Coupled with the diazo-compound of-", for "(2-methyl-phenoxy) read (2'-methyl-phenoxy); item 8, for ".(4-methoxy-phenoxy) read (4'-methoxy-phenoxy); item 27, for "(4-chlor-phenoxy)" read (4'-chlorphenoxy); item 28, for "(naphthyl-2-hydroxy) read (naphthyl-2'-hydroxy); item 48, in the column under the heading "Aceto-acetyl compound of-", for "1-amino-2-ethoxy-5-ethyl-4-chlorobenzene" read 1-amino-2-ethoxy-5-methyl-4-chlorobenzene; and that the said Letters Patent should be read with this correction therein that the same may conform to the record of the case in the Patent Office.

Signed and sealed this 25th day of April, A.D. 1939.

Henry Van Arsdale (Seal) Acting Commissioner of Patents.